United States Patent

Weiland et al.

[11] Patent Number: 5,314,227
[45] Date of Patent: May 24, 1994

[54] BEZEL LOCKING VISOR MOUNT

[75] Inventors: Walter M. Weiland, Holland; Jerry M. De Jong, West Olive, both of Mich.

[73] Assignee: Prince Corporation, Holland, Mich.

[21] Appl. No.: 38,625

[22] Filed: Mar. 26, 1993

[51] Int. Cl.⁵ .............................................. B60J 3/02
[52] U.S. Cl. .................................. 296/97.9; 248/289.1
[58] Field of Search ............... 296/97.9, 97.11-97.13; 248/289.1

[56] References Cited

U.S. PATENT DOCUMENTS

| | | | |
|---|---|---|---|
| 2,357,974 | 9/1944 | Roberts | 248/289.1 |
| 4,178,035 | 12/1979 | Cziptschrisch | 296/97.9 |
| 4,227,241 | 10/1980 | Marcus | 362/61 |
| 4,377,020 | 3/1983 | Vigo | 296/97.9 |
| 4,500,131 | 2/1985 | Fleming | 296/97.9 |
| 4,529,157 | 7/1985 | Suman et al. | 248/289.1 |
| 4,553,797 | 11/1985 | Marcus | 296/97.1 |
| 4,569,552 | 2/1986 | Marks | 296/97.9 |
| 4,634,196 | 1/1987 | Nestell | 339/5 R |
| 4,893,866 | 1/1990 | Dowd et al. | 296/97.11 |
| 5,082,322 | 1/1992 | Cekander et al. | 296/97.9 |
| 5,201,564 | 4/1993 | Price | 296/97.9 |

FOREIGN PATENT DOCUMENTS 1965143 7/1970 Fed. Rep. of Germany .
2341940 6/1978 Fed. Rep. of Germany .

*Primary Examiner*—Robert R. Song
*Attorney, Agent, or Firm*—Price, Heneveld, Cooper, DeWitt & Litton

[57] ABSTRACT

The snap-in visor mount of the present invention employs a polymeric attachment member which includes at least one resilient spaced leg for gripping the upper surface of the sheet metal roof of the vehicle and which cooperatively is engaged by a snap-in bezel for both urging the leg of the attachment member into a locking position as well as interlocking the bezel with the attachment member.

20 Claims, 1 Drawing Sheet

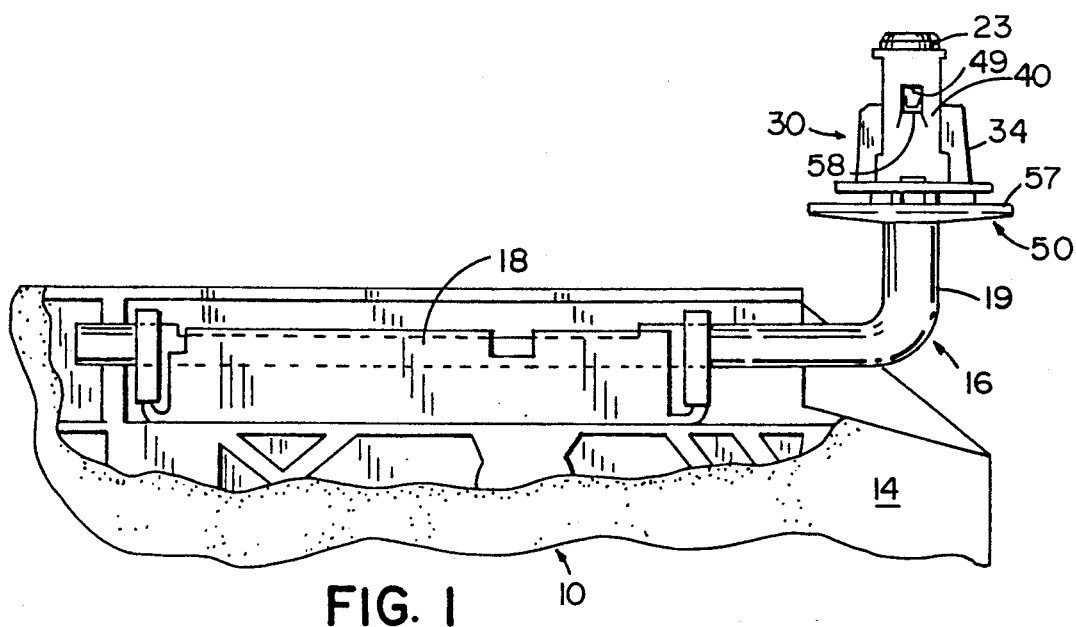
FIG. 1
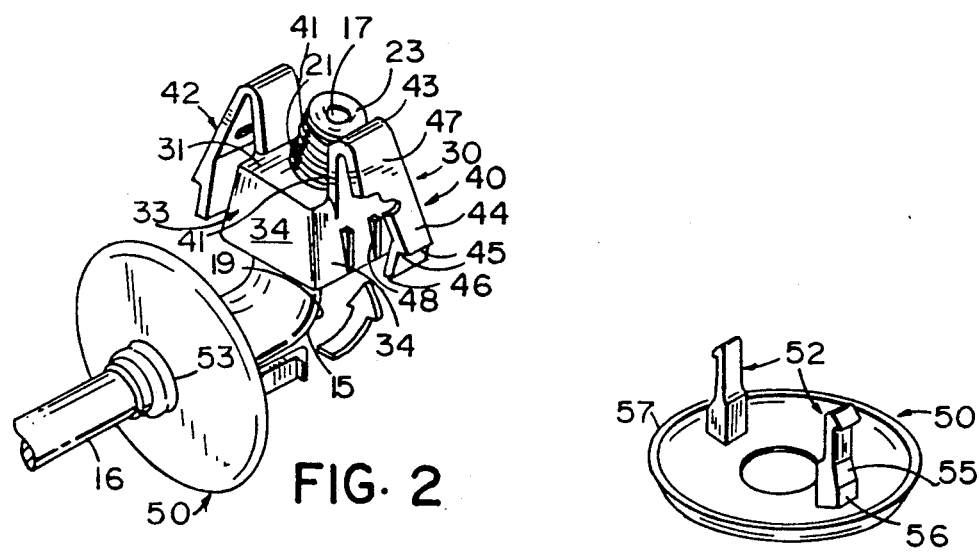
FIG. 2
FIG. 3
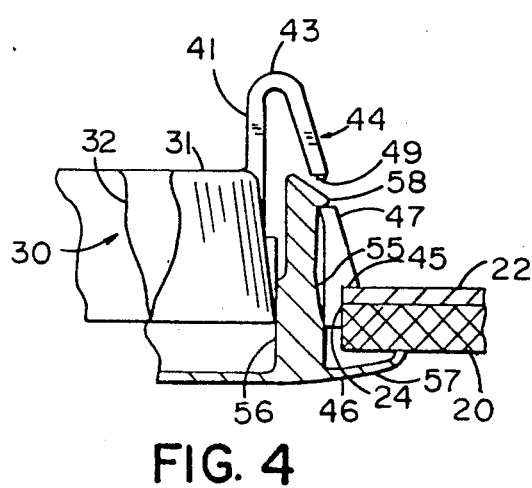
FIG. 4

BEZEL LOCKING VISOR MOUNT

BACKGROUND OF THE INVENTION

The present invention relates to automotive visors and particularly to a mounting assembly for attaching a visor to a vehicle.

Conventionally, visors are mounted to vehicles by an elbow bracket assembly which is secured to the sheet metal framework of the vehicle roof by fastening screws. There also exists a variety of snap-in mounts including those of the type shown in U.S. Pat. Nos. 2,357,974; 4,178,035; and in German Patentschrift No. 23 41 940. Also known are the visor mounts disclosed in U.S. Pat. Nos. 4,569,552; 4,553,797; 4,529,157; and 4,634,196 which are assigned to the present assignee. U.S. Pat. application Ser. No. 989,913 filed Dec. 12, 1992 and entitled VISOR MOUNT also assigned to the present assignee discloses a twist-in visor mount.

Although snap-in and other types of visor mounting systems which avoid manual attachment to the vehicle using fastening screws are preferable, other fastening systems of the prior art tend to be either excessively complex, and therefore costly, or the visors are too easily removed, thus not providing secure installation. Snap-in visor mounts utilizing plastic materials, although preferable from a cost standpoint, tend to loosen due to creeping of the plastic material, thereby providing an unacceptable visor mount for long term use.

SUMMARY OF THE PRESENT INVENTION

The system of the present invention provides a snap-in visor mount which can employ as its primary fastening structure a polymeric attachment member which includes at least one resilient spaced leg for gripping the upper surface of the sheet metal roof of the vehicle and which cooperatively is engaged by a snap-in bezel for both urging the leg of the attachment member into a locking position as well as interlocking the bezel with the attachment member. Such construction allows the relatively easy installation of a visor by the snap-in installation of the visor attachment member into an aperture in the vehicle roof which is subsequently locked into position by snap locking the trim bezel for the extending visor rod. This can be easily achieved during assembly without the use of specialized tools or labor.

Visor mounting systems embodying the present invention include a visor pivot rod having an L-shaped configuration with an integral attachment member and torque fitting secured to one end. The attachment member has a pair of opposed outwardly and downwardly extending spaced legs having a generally horizontally extending ledge spaced inwardly from an end of the legs for engaging the upper surface of a vehicle roof. The legs further include means such as slots formed therein for lockably receiving upwardly extending tabs of a trim bezel which encircles the pivot rod and includes a pair of spaced tabs aligned with and extending between the body of the attachment member and the outwardly extending legs for wedging the legs into an expanded position for locking the attachment member to the vehicle roof.

The bezel tabs lockably engage the slot means of the legs with an upward facing peripheral rim of the bezel engaging the undersurface of the vehicle roof to compressibly engage, in cooperation of the ledges of the leg means, the roof supporting structure for holding the visor to the vehicle roof.

Such construction thereby allows the relatively easy installation and permanent attachment of a visor to a vehicle roof utilizing relatively few parts which can be integrally molded of a polymeric material to reduce cost and complexity of the visor mounting system, as well as facilitate its installation. These and other features, objects and advantages of the present invention will become apparent upon reading the following description thereof, together with reference to the accompanying drawings in which:

BRIEF DESCRIPTION OF THE DRAWINGS

FIG. 1 is a fragmentary, front elevational view, partially broken away, of a visor including the mounting assembly of the present invention;

FIG. 2 is an enlarged, fragmentary perspective view of the visor mounting system of the present invention;

FIG. 3 is an enlarged, perspective view of the bezel shown in FIGS. 1 and 2; and FIG. 4 is an enlarged, fragmentary, vertical cross-sectional view of the visor mounting system shown installed in the vehicle roof.

DETAILED DESCRIPTION OF THE PREFERRED EMBODIMENT

Referring initially to FIG. 1, there is shown a visor 10 embodying the present invention. The visor may include a molded, polypropylene or other type of visor core 12 covered by a suitable upholstery fabric 14 which is selected to conform the appearance of the visor to the upholstery of the vehicle to which it is installed. The visor body is secured to the vehicle by a generally L-shaped hollow steel visor pivot rod 16 having one end secured to the visor body by means of a torque spring clamp 18 of the type disclosed in U.S. Pat. No. 4,500,131. The torque clamp 18 allows movement of the visor between a lowered use position and a snap-up raised stored position against the vehicle headliner 20.

The opposite end of the pivot rod 16 is mounted to the vehicle roof through the headliner by means of attachment member 30. The headliner 20 is a molded substrate having an upholstered exterior surface facing the inside of the vehicle and which overlies the sheet metal roof structure 22 which includes a rectangular aperture 24 formed (FIG. 4) therein and aligned with a similarly shaped aperture in headliner 20 for receiving the visor mounting attachment member 30 embodying the present invention. A bezel 50 slides over the pivot rod 16 as best seen in FIG. 2 and provides the multiple functions of providing a trim covering for the end of the L-shaped visor pivot rod 16 and its interface with headliner 20 and locking the mounting attachment member 30 in place, thereby attaching the visor to the vehicle roof. Visor 10 may be of the type disclosed in U.S. Pat. No. 4,227,241 which includes an illuminated vanity mirror assembly. In such case, electrical conductors for providing operating power to the illumination means for the visor will extend through the hollow pivot rod 16.

Turning now to FIGS. 2-4, the visor mounting system including the bezel locking structure of this invention is described in greater detail. The upwardly turned end 17 of the visor pivot rod 16 and the right angle elbow 15 includes, integrally molded thereon, a polymeric tapered conical sleeve 19 which has an externally conically tapered surface which engages a similarly conically tapered aperture 32 of the mounting attachment member 30. Sleeve 19 may be of a suitable polymeric material such as polycarbonate and provides a controlled rotational torque between the visor pivot rod and attachment member 30.

The visor rod end 17 is mounted to member 30 in a conventional manner by use of a compression spring 21 and washer 23 which is held in place on a visor rod end 17 by rolling the rod end over in a conventional manner. Thus, one end of the compression spring 21 engages the top surface 31 of the generally block-shaped attachment member 30 while its opposite end engages the washer 23 for holding the visor rod to the attachment member providing a predetermined rotational torque between the two polymeric members 30 and 19 which allows the visor to be moved from a front window to a side window position in a controlled fashion and remain in the selected position.

The attachment member 30 is also molded of a suitable polymeric material such as polycarbonate and includes a generally rectilinear block-shaped body 33 having four downwardly, and somewhat outwardly tapered, sidewalls 34. At least a pair of the opposed sidewalls include generally U-shaped legs 40 and 42 which extend upwardly from the top surface 31 of the body 33, with an upwardly extending leg 41 and hence downwardly at bend 43 to a downwardly depending leg 44 which terminates in a tip 46 having an intermediate ledge 45 spaced upwardly from the tip 46 a distance selected to allow the tip end 46 to extend through aperture 24 in sheet metal 22 and partially through the headliner 20 as best seen in FIG. 4.

The sidewalls 34 of member 30 which include legs 40 and 42 also include spaced, parallel generally triangular guide ramps 48 for guidably receiving tabs 52 of the bezel 50 as discussed below. The resilient legs 40 and 42 of member 30 are shaped to extend within the rectangular aperture 24 and compress slightly as the outwardly inclined outer surface 47 of the legs ride against the edges of the aperture 24 in the vehicle roof until the ledge 45 snaps over the edge of the aperture. This is easily identified by the installer by the snap action of the device as it is inserted into the aperture. The attachment member 30 and legs 42 and 44 are then locked into their expanded roof engaging position by the interaction of the bezel 50 with the attachment member 30.

The bezel 50 includes a central aperture 53 having a diameter allowing the bezel to slide over the torque collar 19 of the visor elbow rod 16 as seen in FIG. 2. The bezel further includes upwardly extending tabs 52 which align with the ramps 48 on the sidewalls of attachment member 30 and are tapered with a ramp section 55 to a widened base 56 to wedge against the outer surface of wall 34 of member 30 and the inner surface of the downwardly depending legs 40 and 42 as best seen in FIG. 4. This locks the legs in an outwardly extended position as seen in FIG. 4 so as to remain in a firm aperture engaging position. The top of tabs 52 include an outwardly extending flange 58 which interlocks the bezel to the attachment member 30 for installation. For such purpose the flanges 58 extend through means such as slots 49 in legs 40 and 42 for snap-fitting the bezel in a locked position with respect to member 30. The bezel includes an outer, generally circular, upwardly facing rim 57 which engages headliner 20 in compression with the ledges 45 engaging the top surface of sheet metal 22 of the vehicle roof for holding the visor in place.

Thus, the bezel 50 not only provides a trim appearance to the visor installation, once snapped into position, it also cooperatively interlocks with the attachment member 30 for wedging the resilient legs 40 and 42 into a permanent locking position against the rectangular aperture 24 in the vehicle roof. The wedge-shaped locking legs 52 of the bezel assure the spring-loaded locking legs of the torque fitting remain in a locked position while the bezel is locked to the torque fitting using the outwardly extending tabs 58 which fit through apertures 49 in the torque fitting legs. In this manner, the bezel and torque fitting are both snap-fitted together, as well as the torque fitting being snap-fitted within the roof of the vehicle. If desired, the bezel 50 may include apertures for the insertion of a small tool for deflecting legs 52 inwardly for removing the bezel and subsequently the deflection and removal of the torque fitting legs of servicing of the visor.

By this construction therefore, a relatively inexpensive two-piece cooperating attachment member and bezel construction is provided for the easy installation of a visor to a vehicle without the use of specialized tools and provides a permanent installation using plastic materials. It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A visor mount for attaching a vehicle visor to the roof structure of a vehicle comprising:
   a visor pivot rod having a first end for extending within the body of a visor and a second end;
   an attachment member including a body having an aperture for receiving said second end of said pivot rod, said attachment member further including at least one resilient leg extending outwardly and downwardly in spaced relationship from said body and including means for engaging an edge and upper surface of a mounting aperture in the vehicle roof support structure; and
   a bezel extending over said pivot rod and including tab means which cooperates with said leg of said attachment member to lock said bezel to said attachment member when said bezel is installed with said tab means extending between said body and said leg for urging said leg into locking engagement with the roof structure.

2. The visor mount as defined in claim 1 wherein said body of said attachment member is generally block-shaped and includes a pair of legs extending outwardly and downwardly from opposite sides of said body.

3. The visor mount as defined in claim 1 wherein said means for engaging an upper surface of the vehicle roof support comprises ledge means formed in said leg in spaced relationship from an end of said leg remote from the junction of said leg to said body.

4. The visor mount as defined in claim 1 wherein said leg includes slot means for lockably receiving said tab means of said bezel.

5. The visor mount as defined in claim 4 wherein said tab means includes a flange at an end thereof for extending into said slot means of said leg.

6. The visor mount as defined in claim 5 wherein said attachment member and said bezel are made of a polymeric material.

7. A visor mount for attaching one end of a visor pivot rod to a vehicle, said mount comprising:

an attachment member including a generally rectangular body having a pair of resiliently deflectable legs extending outwardly and downwardly therefrom for engaging the edge of a mounting aperture for said attachment member, said body further including an aperture for receiving an end of a pivot rod therein;

means for securing a pivot rod end to said body; and a trim bezel for surrounding a pivot rod and including tab means extending upwardly to extend between each of said legs of said body and said body for urging said legs into locking engagement with the vehicle, said tab means interlocking with said legs of said body for holding said bezel in fixed position relative to said body.

8. The visor mount as defined in claim 7 wherein said legs include ledge means spaced from an end of said legs remote from the junction of said legs with said body for engaging an upper surface of the vehicle support structure receiving said attachment member.

9. The visor mount as defined in claim 8 wherein said legs include apertures formed therein and wherein said tab means include a flange extending into said apertures of said legs for interlocking said bezel to said body.

10. The visor mount as defined in claim 9 wherein said bezel includes a upwardly facing peripheral surface for engaging the underside of the vehicle support structure and wherein said peripheral surface is spaced from said ledge of said legs a distance for compressibly holding said bezel to the vehicle support structure.

11. The visor mount as defined in claim 10 wherein said attachment member and said bezel are made of a polymeric material.

12. The visor mount as defined in claim 11 wherein said tab means include a tapered lower section for wedging said legs away from said body when said bezel is interlocked with said attachment member.

13. The visor mount as defined in claim 12 wherein said body includes tapered sides.

14. A visor mount for attaching a vehicle visor to the roof structure of a vehicle comprising:

a visor pivot rod having a first end for extending within the of a visor and a second end;

an member including a body having an aperture for receiving said second end of said pivot rod, said attachment member further including a pair of resilient legs extending outwardly and downwardly in spaced relationship from opposite sides of said body and including means for engaging an edge and upper surface of a mounting aperture in the vehicle roof support structure; and a bezel extending over said pivot rod and including tab means which cooperates with said legs of said attachment member when said bezel is installed with said tab means extending between said body and said legs for urging said legs into locking engagement with the roof structure.

15. The visor mount as defined in claim 14 wherein said legs and tab means include means for interlocking said tab means to said legs for securing said bezel to said attachment member.

16. The visor mount as defined in claim 15 wherein said body of said attachment member is generally block-shaped.

17. The visor mount as defined in claim 16 wherein said means for engaging an upper surface of the vehicle roof support comprises ledge means formed in said legs in spaced relationship from an end of said leg remote from the junction of said leg to said body.

18. The visor mount as defined in claim 17 wherein said legs include slot means for lockably receiving said tab means of said bezel.

19. The visor mount as defined in claim 18 wherein said tab means includes a flange at an end thereof for extending into said slot means of said legs.

20. The visor mount as defined in claim 19 wherein said attachment member and said bezel are made of a polymeric material.

* * * * *

UNITED STATES PATENT AND TRADEMARK OFFICE
CERTIFICATE OF CORRECTION

PATENT NO. : 5,314,227
DATED : May 24, 1994
INVENTOR(S) : Walter M. Weiland et al.

It is certified that error appears in the above-indentified patent and that said Letters Patent is hereby corrected as shown below:

Column 4, line 18
"legs of" should be --legs for--;

Column 6, line 6
After "within the" insert --body--;

Column 6, line 7
Before "member" insert --attachment--.

Signed and Sealed this

Twentieth Day of December, 1994

*Attest:*

BRUCE LEHMAN

*Attesting Officer*     *Commissioner of Patents and Trademarks*